July 26, 1966     H. ENG     3,262,263
PROPELLANT PURGE SYSTEM
Filed Jan. 16, 1964
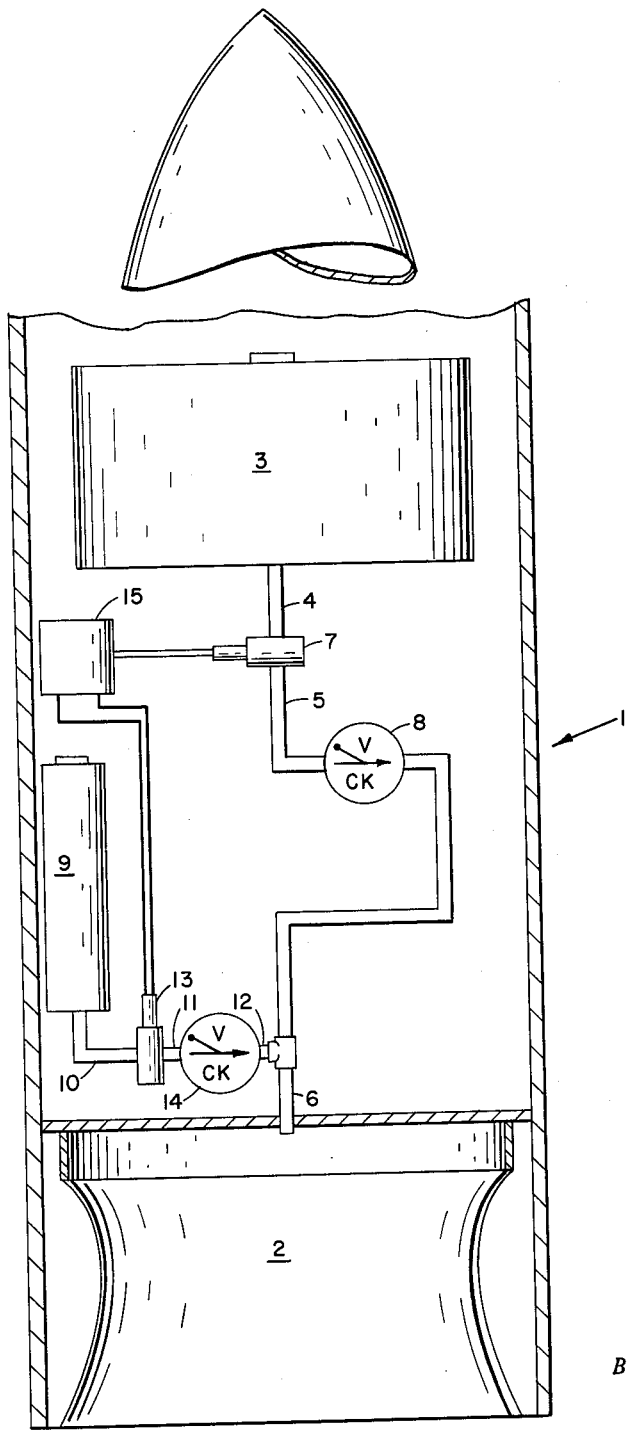
Harvard Eng,
*INVENTOR.*
BY *Harry M. Saragovitz*
*Edward J. Kelly*
*Herbert Berl*
*James E. Staudt*

United States Patent Office 3,262,263
Patented July 26, 1966

3,262,263
PROPELLANT PURGE SYSTEM
Harvard Eng, Huntsville, Ala., assignor to the United States of America as represented by the Secretary of the Army
Filed Jan. 16, 1964, Ser. No. 338,269
5 Claims. (Cl. 60—35.6)

The invention described herein may be manufactured and used by or for the Government for governmental purposes without the payment of any royalty thereon.

The present invention relates to a system for safely extinguishing rocket motors burning liquid fuels. With liquid propellant fuels having high burning rates such as those used in missile systems today safety and controllability of their burning in rocket motors has become extremely difficult. One of the primary problems has been a tendency of the flame in the ignition or burning chamber of liquid fuel motors to follow the fuel back through the injectors, into the fuel supply system thus causing the system to explode. It has been found that so long as a solid flow of the propellant is supplied to the burning chamber at the proper pressure the problem is minimum, however should bubbles or gas pockets be present in the fuel stream the flame will follow the pockets back into the fuel supply system. These gas pockets occur most frequently as the supply tank becomes very low on fuel. When the fuel level becomes low a swirling action occurs at the tank outlet thus allowing gas pockets to be formed in the propellant stream.

The present device overcomes the problem of fuel stream bubbles by supplying a non-flammable purge fluid into the fuel line thus providing an efficient means for shutting off the rocket motor by filling a portion of the fuel lines with the non-flammable purging liquid before the propellant becomes low enough to cause bubbles in the fuel stream.

Accordingly it is an object of this invention to provide an effective and safe means of extinguishing a liquid fuel rocket motor.

Another object of my invention is to provide a missile fuel system which may be accurately programmed throughout the duration of operation of the motor.

Yet another object of my invention is to provide a rocket motor control system which may be simply adapted to use on present rocket motor fuel systems.

This invention together with other objects and advantages thereof will be best understood by reference to the following description and accompanying drawings, in which:

The figure is a diagrammatic showing of the device as arranged in a missile which is partially cut away for purposes of clarity.

Referring now to the figure, the missile body 1 houses a rocket motor 2 which is of the liquid fuel type and is supplied by a propellant tank 3 via fuel lines 4, 5, and 6. An electrically operated propellant supply valve 7 is located between lines 4 and 5 while a one-way pressure operated valve 8 is connected between lines 5 and 6. A purge supply tank 9 is connected in fluid communication with fuel line 6 via purge lines 10, 11, and 12. An electrically operated purge supply valve 13 is located between lines 10 and 11, while a pressure operated one-way valve 14 is connected between lines 11 and 12. Check valves 8 and 14 are designed to provide fluid flow in the direction of the rocket motor only when the pressure of their respective supply tanks is greater than the pressure downstream from the valves. Supply valves 7 and 13 are operated by a timing mechanism 15 which may be programmed to operate the respective valves at a predetermined time, or the mechanism may be controlled from a remote position.

In operation of the device the primary objective of the purge system is to prevent partial fuel flow to the rocket motor, that is to eliminate the possibility of air pockets in the fuel stream. At a predetermined time before final evacuation of the propellant tank timing mechanism 15 will open purge valve 13 allowing flow of the non-flammable purging fluid through check valve 14 and into lines 12 and 6. The purge tank pressure is maintained higher than the pressure in the propellant tank. Application of the purge tank pressure in line 6 will close one-way propellant valve 8 which in turn immediately shuts off flow from the propellant tank to the rocket motor. Thus, the final full stream of fuel fed to the motor will be followed by a full stream of non-flammable fluid purge. At this point the propellant supply valve is closed by timing mechanism 15 to prevent fuel flow after the purge tank has been emptied. The final step is necessary since in some instances hot-spots in the rocket motor could cause re-ignition if fuel were again supplied.

Thus, it will be seen that the purge system provides an extremely effective means of preventing supply of a partial flow of fuel to the rocket motor and in so doing eliminates the possibility of explosion caused by this phenomenon.

While the foregoing is a description of a preferred embodiment, the following claims are intended to include those modifications and variations that are within the spirit and scope of my invention.

I claim:

1. A fuel purge system comprising: a pressurized fuel supply, means for providing fluid communication between said fuel supply and a rocket motor, means for supplying a non-flammable purging liquid to said motor, means for interrupting fluid communication between said fuel supply and said rocket motor and simultaneously opening fluid communication between said non-flammable liquid supply and said motor at a predetermined time before complete evacuation of said fuel supply.

2. A device as set forth in claim 1, which further comprises an electrically operated valve for maintaining said fuel communication means in a non-communicating condition after evacuation of said non-flammable supply means.

3. A fuel purge system comprising: a pressurized fuel supply tank, means for providing fluid communication between said fuel supply tank and a rocket motor, a fuel supply valve connected in said communication means between said fuel supply tank and said motor, a pressure operated one-way fuel valve connected in said communication means between said fuel supply valve and said rocket motor, a pressurized purge supply tank, fluid communication means connected to said purge supply tank, means for connecting said purge communication means to said fuel communication means between said motor and said one-way fuel valve, a purge supply valve connected in said purge communication means between said purge tank and said connecting means, a pressure operated one-way purge valve connected in said purge communication means between said purge supply valve and said communication connecting means, and a timing mechanism connected to said purge and fuel supply valves for sequential operation thereof.

4. A fuel purge system comprising: a pressurized fuel supply, fuel communication means connected between said fuel supply and a rocket motor, fuel supply valve means in said fuel communication means, fuel flow control means connected in said fuel communication means between said valve means and said motor for permitting liquid flow only toward said motor, a pressurized purge supply means, the pressure in said purge supply being higher than the pressure in said fuel supply, purge communication means connected between said purge supply and said fuel communication means downstream of said fuel flow control means, purge supply valve means in said purge communication means, purge flow control means connected in said purge communication means between said purge supply valve and said motor for permitting liquid flow only toward said motor, and means for actuating said fuel and purge supply valves in a predetermined sequence and at predetermined times.

5. A fuel purge system comprising: a fuel supply; fuel communication means connected between said fuel supply and a rocket motor; a non-flammable purge supply means connected in fluid communication with said fuel communication means; and flow converting means for selectively supplying said motor with either fuel or purging fluid, said converting means comprising a purge supply valve between said purge supply means and said fuel communication means, a pressure actuated one-way valve between said fuel supply and said purge supply for preventing fuel flow from said rocket motor to said fuel supply, a fuel supply valve between said fuel supply and said one-way valve, and means for selectively actuating said supply valves in a predetermined sequence and at predetermined times.

References Cited by the Examiner
UNITED STATES PATENTS

| | | |
|---|---|---|
| 2,890,843 | 6/1959 | Attinello. |
| 2,949,007 | 8/1960 | Aldrich et al. _____ 60—35.6 |
| 2,949,009 | 8/1960 | D'Ooge _____ 60—39.09 X |
| 3,143,855 | 8/1964 | Abild _____ 60—39.48 X |
| 3,162,009 | 12/1964 | Abild et al. _____ 60—35.6 |

MARK NEWMAN, *Primary Examiner.*

D. HART, *Assistant Examiner.*